(12) United States Patent
Giovannetti et al.

(10) Patent No.: US 11,384,027 B2
(45) Date of Patent: Jul. 12, 2022

(54) SILICIDE-BASED COMPOSITE MATERIAL AND PROCESS FOR PRODUCING THE SAME

(71) Applicant: Nuovo Pignone Tecnologie Srl, Florence (IT)

(72) Inventors: Iacopo Giovannetti, Florence (IT); Antonella Dimatteo, Florence (IT); Massimo Giannozzi, Florence (IT); Francesco Mastromatteo, Florence (IT); Pierluigi Tozzi, Florence (IT)

(73) Assignee: Nuovo Pignone Tecnologie Srl, Florence (IT)

( * ) Notice: Subject to any disclaimer, the term of this patent is extended or adjusted under 35 U.S.C. 154(b) by 724 days.

(21) Appl. No.: 15/575,976

(22) PCT Filed: May 19, 2016

(86) PCT No.: PCT/EP2016/061272
§ 371 (c)(1),
(2) Date: Nov. 21, 2017

(87) PCT Pub. No.: WO2016/188855
PCT Pub. Date: Dec. 1, 2016

(65) Prior Publication Data
US 2018/0346385 A1      Dec. 6, 2018

(30) Foreign Application Priority Data

May 22, 2015 (IT) .................. 102015000017234

(51) Int. Cl.
*B32B 15/04*        (2006.01)
*C04B 35/58*        (2006.01)
(Continued)

(52) U.S. Cl.
CPC ........ *C04B 35/58092* (2013.01); *B32B 18/00* (2013.01); *C04B 35/58064* (2013.01);
(Continued)

(58) Field of Classification Search
CPC .................. C04B 35/58092; C04B 2235/3873
(Continued)

(56) References Cited

U.S. PATENT DOCUMENTS 4,825,658 A * 5/1989 Beebe .................... F02C 7/266
                                                             431/268
5,304,778 A    4/1994 Dasgupta et al.
(Continued)

FOREIGN PATENT DOCUMENTS

CN       104511589 A      4/2015
DE       199 52 127 A1    5/2001
(Continued)

OTHER PUBLICATIONS

Search Report and Written Opinion issued in connection with corresponding IT Application No. 102015000017234 dated Jan. 6, 2016.
(Continued)

*Primary Examiner* — Lauren R Colgan
(74) *Attorney, Agent, or Firm* — Baker Hughes Patent Org.

(57) ABSTRACT

A silicide-based composite material is disclosed, comprising a silicide of Mo, B, W, Nb, Ta, Ti, Cr, Co, Y, or a combination thereof, Si3N4, and at least an oxide, as well as and a process for producing the same.

5 Claims, 2 Drawing Sheets

(51) Int. Cl.
  *C04B 35/645*  (2006.01)
  *B32B 18/00*  (2006.01)
  *C04B 35/65*  (2006.01)
  *C04B 35/657*  (2006.01)
  *F01D 5/28*  (2006.01)

(52) U.S. Cl.
  CPC .... *C04B 35/58085* (2013.01); *C04B 35/6455* (2013.01); *C04B 35/652* (2013.01); *C04B 35/657* (2013.01); *C04B 2235/3225* (2013.01); *C04B 2235/3229* (2013.01); *C04B 2235/3873* (2013.01); *C04B 2235/3891* (2013.01); *C04B 2235/6026* (2013.01); *C04B 2235/665* (2013.01); *C04B 2235/72* (2013.01); *C04B 2235/721* (2013.01); *C04B 2235/722* (2013.01); *C04B 2235/723* (2013.01); *C04B 2235/77* (2013.01); *C04B 2235/786* (2013.01); *C04B 2235/85* (2013.01); *C04B 2235/96* (2013.01); *C04B 2235/9684* (2013.01); *C04B 2237/36* (2013.01); *C04B 2237/704* (2013.01); *F01D 5/282* (2013.01); *F05D 2230/234* (2013.01)

(58) Field of Classification Search
  USPC .................................................. 428/689, 446
  See application file for complete search history.

(56) References Cited

U.S. PATENT DOCUMENTS

| | | | |
|---|---|---|---|
| 5,439,855 A | 8/1995 | Rosenthal | |
| 6,288,000 B1 | 9/2001 | Hebsur | |
| 6,737,015 B1 | 5/2004 | Knoll et al. | |
| 2003/0010409 A1 | 1/2003 | Kunze et al. | |
| 2009/0212035 A1 | 8/2009 | Herrmann et al. | |
| 2012/0190530 A1* | 7/2012 | Mikijelj | ............... C04B 35/584 501/97.3 |
| 2015/0090074 A1 | 4/2015 | Etter et al. | |
| 2016/0083303 A1 | 3/2016 | Mironets et al. | |

FOREIGN PATENT DOCUMENTS

| | | |
|---|---|---|
| JP | H05221728 A | 8/1993 |
| JP | H07-111760 A | 4/1995 |
| JP | 2000-128637 A | 5/2000 |
| JP | 2005221728 A | 8/2005 |
| JP | 2007111760 A | 5/2007 |
| JP | 2008501929 A | 1/2008 |
| JP | 2013075796 A | 4/2013 |
| JP | 2015012911 A | 1/2015 |
| WO | 0145882 A2 | 6/2001 |
| WO | 2015012911 A2 | 1/2015 |

OTHER PUBLICATIONS

Invitation to Pay Additional Fees issued in connection with corresponding PCT Application No. PCT/EP2016/061272 dated Jul. 22, 2016.

International Search Report and Written Opinion issued in connection with corresponding PCT Application No. PCT/EP2016/061272 dated Mar. 22, 2017.

International Preliminary Report on Patentability issued in connection with corresponding PCT Application No. PCT/EP2016/061272 dated Nov. 28, 2017.

* cited by examiner

SILICIDE-BASED COMPOSITE MATERIAL AND PROCESS FOR PRODUCING THE SAME

FIELD OF INVENTION

Embodiments of the subject matter disclosed herein relate primarily to a silicide-based composite material and a process for producing the same.

BACKGROUND OF THE INVENTION

For gas turbine applications (buckets, nozzles, shrouds) nickel-base superalloys are used.

However, in this field, nickel-base superalloys encounter one fundamental limitation, i.e. their melting point. Since advanced superalloys melt at temperatures in the order of 1350° C., significant strengthening can be obtained only at temperatures below 1150° C.

In this regard, the investigations about new materials suitable for gas turbine applications are beginning to accelerate with the aim to exceed the superalloys' mechanical and physical limits. The intended development can only be achieved by providing the improvement of the essential properties of the structural materials such as thermal fatigue, oxidation resistance, strength/weight ratio and fracture toughness. There are two different type of materials which are candidate to resist the operating conditions about 1200° C.; first one is structural ceramics such as SiC, $Si_3N_4$ and the second one is structural silicides such as $MoSi_2$.

In this view, materials comprising $MoSi_2+Si_3N_4$ system are developed, which possess low density, excellent oxidation resistance, flexural resistance and creep properties. However, up to now said materials, typically produced by sintering, are not used for gas turbine applications due to its low fracture toughness (lower than 10 MPa $m^{0.5}$).

BRIEF DESCRIPTION OF THE INVENTION

Therefore, there is a general need for materials suitable for gas turbine applications, which show good properties in terms of thermal fatigue at the operating conditions, low density, oxidation resistance, flexural resistance, creep properties and fracture toughness.

An important idea is to provide a material wherein the blending a silicide and $Si_3N_4$ powder is performed in the presence of oxide particles in order to control the final microstructure and enhance mechanical properties.

Another important idea is to improve the process of production of said material thus overcoming the limitations observed for the sintering process.

First embodiments of the subject matter disclosed herein correspond to a silicide-based composite material comprising a silicide of Mo, B, W, Nb, Ta, Ti, Cr, Co, Y, or a combination thereof, $Si_3N_4$, and at least an oxide selected from the group consisting of Yttrium oxides, Cerium oxides, and combinations thereof.

Second embodiments of the subject matter disclosed herein correspond to a process for producing the silicide-based composite material, said process comprising the steps of: providing powders of silicide, $Si_3N_4$, and at least an oxide, homogeneously blending the powders, lying at least a first layer of blended powders on a support surface, melting at least a part of the powders by activating a power source, said source having an energy power of 150-1000 W, and allowing the melted powders to cool and solidify, thus obtaining the silicide-based composite material.

In general, the process can be carried out until a desired thickness and shape of the silicide-based composite material is achieved.

Third embodiments of the subject matter disclosed herein correspond to a silicide-based composite material obtainable by the process above.

In general, said material shows remarkably improved mechanical, physical and thermal properties with respect to conventional super-alloys.

Fourth embodiments of the subject matter disclosed herein correspond to a gas turbine hot gas path (HGP) component, such as a bucket, nozzle, and shroud, made of the above material.

BRIEF DESCRIPTION OF DRAWINGS

The accompanying drawings, which are incorporated herein and constitute a part of the specification, illustrate exemplary embodiments of the present invention and, together with the detailed description, explain these embodiments. In the drawings.

DETAILED DESCRIPTION OF THE INVENTION

Figure 1:
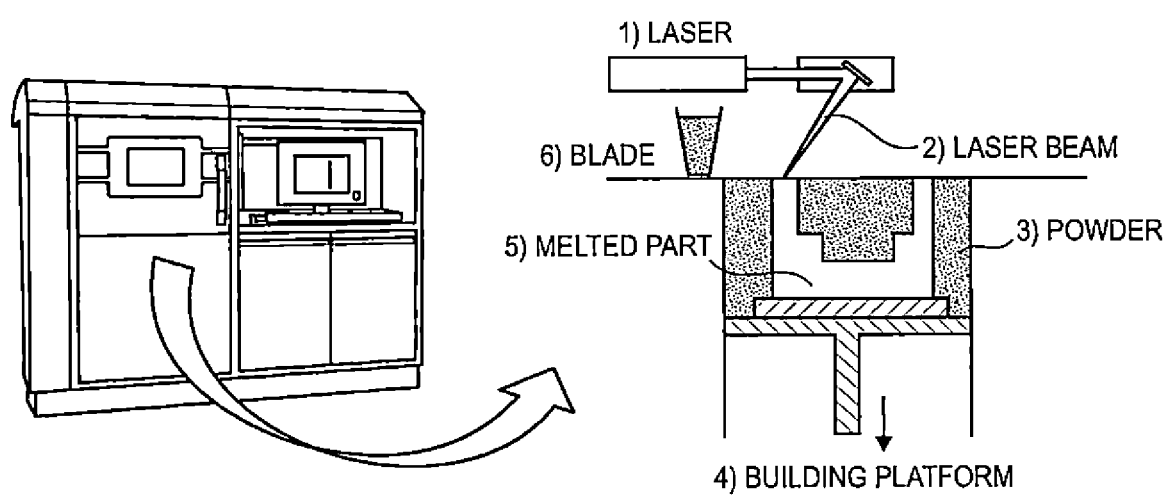
FIG. 1 shows a schematic cross section of a Direct Metal Laser Melting (DMLM) apparatus.

The following description of exemplary embodiments refers to the accompanying drawings.

The following description does not limit the invention. Instead, the scope of in an embodiment defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

First embodiments of the subject matter disclosed herein correspond to a silicide-based composite material comprising a silicide of Mo, B, W, Nb, Ta, Ti, Cr, Co, Y, or a combination thereof, $Si_3N_4$, and at least an oxide selected from the group consisting of Yttrium oxides, Cerium oxides, and combinations thereof.

Said silicide is in an embodiment selected from the group consisting of $MoSi_2$, $Mo_5SiB_2$, $Mo_3Si$, $Mo_5SiB_2$, α-Mo—$Mo_5SiB_2$—$Mo_3Si$, $WSi_2$, $NbSi_2$, $TaSi_2$, $TiSi_2$, $CrSi_2$, $CoSi_2$, $YSi_2$, $Mo_5Si_3$, $Ti_5Si_3$, and combinations thereof.

In embodiments, said silicide is selected from the group consisting of $MoSi_2$, $Mo_5SiB_2$, $Mo_3Si$, $Mo_5SiB_2$, α-Mo—$Mo_5SiB_2$—$Mo_3Si$, $Mo_5Si_3$, and combinations thereof.

In particular embodiments, the material above can comprise at least 35 wt % of silicide, 15-45 wt % of $Si_3N_4$, 0.5-15 wt % of at least an oxide, up to 4 wt % of impurities.

Possible impurities comprise Al, C, Fe, Ca, O, N, or a combination thereof.

In some embodiments of the material above, said at least an oxide is selected from the group consisting of combinations of Yttrium oxides and Cerium oxides.

In embodiments of the material above, said at least an oxide is a combination of an Yttrium oxide and a Cerium oxide.

In embodiments, the material above comprises 20-40 wt % of $Si_3N_4$, 0.5-8 wt % of $Y_2O_3$, 0.5-6 wt % of $CeO_2$, up to 4 wt % of impurities.

In embodiments, the material comprises 20-40 wt % of $Si_3N_4$, 0.5-6 wt % of $Y_2O_3$, 0.5-4 wt % of $CeO_2$, <0.1 wt % of Al, <0.5 wt % of C, <0.1 wt % of Fe, <0.1 wt % of Ca, <1.5 wt % of O, <0.5 wt % of N, the remainder being $MoSi_2$.

In an embodiment, said material has a porosity lower than 0.5%, a density of 4-5 $g/cm^3$, a directionally solidified grain structure, and an average grain size of 50-150 μm.

The maximum dimension of the pores, measurable by SEM, is below 100 μm.

In embodiments, the material has an Ultimate Tensile Strength (UTS) higher than 700 MPa at 23° C. and higher than 550 MPa at 900° C.

In embodiments, the material has a Young's modulus (E) higher than 300 GPa at 23° C. and higher than 290 MPa at 900° C.

In embodiments, the material has a Critical Value of Stress Intensity Factor (Kc) higher than 5 MPa/m at 23° C. and higher than 10 MPa/m at 900° C.

In embodiments, the material comprises $\alpha$-$Si_3N_4$ and $\beta$-$Si_3N_4$, the latter being acicular. In fact, the additive process promotes the growth of acicular $\beta$-$Si_3N_4$; the at least an oxide, in an embodiment in the form of grains having average size <50 μm, induces crack deflection, so this type of microstructure is desirable in order to increase the fracture toughness.

The resulting microstructure of the material is a well dispersed silicide and $Si_3N_4$ particles surrounded by a grain boundary phase. No reaction occurs between silicide and $Si_3N_4$ and no cracks are detected despite the thermal expansion mismatch between the two compounds. The oxides are located to grain boundaries that are supposed to be completely amorphous.

The acicular $\beta$-$Si_3N_4$ is developed and this can be confirmed by XRD measures.

Summarizing, the final microstructures is composed by grains of $Si_3N_4$ (substantially rounded in the α and acicular in the β crystallographic form), by grains of silicide, and by an amorphous phase at grain boundaries containing the oxides (Yttria and Ceria).

Second embodiments of the subject matter disclosed herein correspond to a process for producing the silicide-based composite material, said process comprising the steps of:

i) providing powders of silicide, $Si_3N_4$, and at least an oxide,
ii) homogeneously blending the powders,
iii) lying at least a first layer of blended powders on a support surface,
iv) melting at least a part of the powders by activating a power source, said source having an energy power of 150-1000 W, and
v) allowing the melted powders to cool and solidify, thus obtaining the silicide-based composite material.

In step iv), said power source can be laser or electron beam. In an embodiment, said power source is a laser.

In particular, step iv) can be performed by Direct Metal Laser Melting (DMLM), Selective Laser Melting (SLM), Selective Laser Sintering (SLS), Laser Metal Forming (LMF) or Electron Beam Melting (EBM).

In embodiments, step iv) is performed by Direct Metal Laser Melting (DMLM), more in an embodiment at an energy power of about 300 W.

The process above can be carried out until a desired thickness and shape of the silicide-based composite material is achieved. In this regard, the process can further comprise the steps of: vi) lying a second layer of blended powders on the silicide-based composite material obtained in step v), said second layer at least partially covering the material surface, vii) repeating the steps iv) and v), thus obtaining a second layer of the silicide-based composite material, which adheres to the silicide-based composite material of step v), and optionally viii) repeating the steps vi) and vii) by lying a third and further layers of blended powders, until a desired thickness and shape of the silicide-based composite material is achieved.

It should be noted that the process above can be considered an additive manufacturing process, wherein the 'additive' is said at least an oxide. This kind of process is inexpensive, flexible and efficient, whereby machine components of complex shape can be easily produced at low cost. Use of additive manufacturing processes would be highly desirable for the production of turbomachine or gas turbine components which must satisfy stringent requirements as far as mechanical resistance under heavy operating conditions are concerned, such as high temperature creep resistance under fatigue conditions, for instance.

The process above allows an article having a complex shape to be manufactured layer-by-layer starting from powders, which are locally melted by using a power source. As said, the power source is a laser, as per the exemplary DMLM apparatus of FIG. 1. Additive manufacturing under controlled atmosphere, e.g. using inert gas, and/or under vacuum conditions, prevents chemical alteration.

The process performed by using the DMLM apparatus can be illustrated as follows, with reference to FIGS. 1 and 2.

A first layer of blended powders (powder 3, FIG. 1) from a powder container is distributed on a movable table (building platform 4, FIG. 1) by moving the powder material container one or more times along the movable table which is placed at the height of the target surface, by means of e.g. a blade (blade 6, FIG. 1). The powder layer thickness is in an embodiment lower than 0.06 mm (60 microns), more particularly lower than 0.04 mm (40 microns). Particularly a layer is a thickness of about 0.02 mm.

Figure 2:
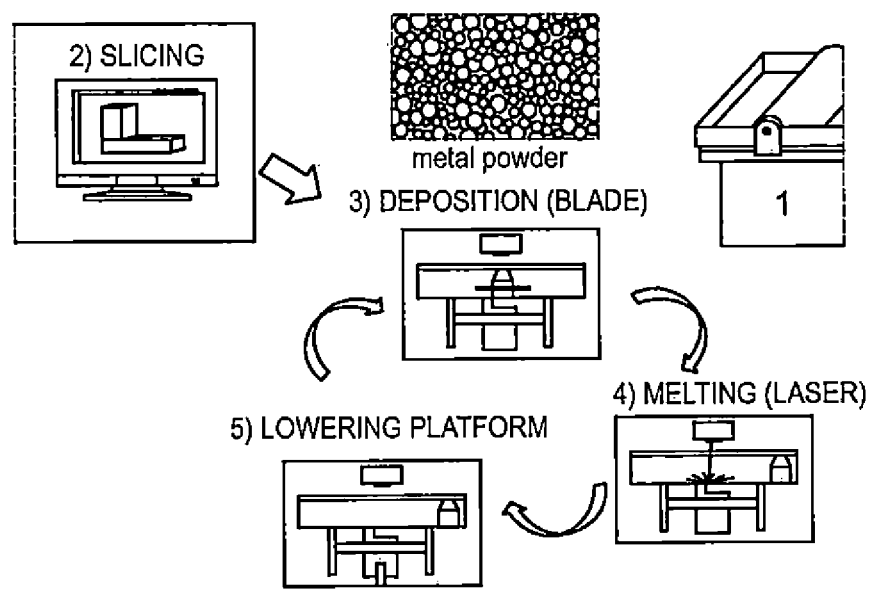
FIG. 2 shows the main process steps when a DMLM apparatus is used.

Once the first layer of blended powders has been prepared (3, deposition (blade), FIG. 2), the power source (laser 1 and laser beam 2, FIG. 1) is activated and controlled such as to locally melt the powders (melted part 5, FIG. 1) in a desired portion of the layer, corresponding to a cross-section of the final product to be manufactured. The power source has an energy power in an embodiment of 150-370 W, more particularly of about 300 W.

The power source scan spacing is in an embodiment arranged in order to provide substantial overlapping of adjacent scan lines. An overlapping scan by the power source enables stress reduction to be provided by the subsequent adjacent scan, and may effectively provide a continuously heat treated material. Power source scan spacing is in an embodiment lower than 0.1 mm (100 microns), more particularly lower than 0.05 mm (50 microns). Particularly the scan spacing is about 0.03 mm.

After melting (4, melting (laser), FIG. 2), the resulting material is allowed to cool and solidify. Powders outside the boundaries of the cross-section of the final product to be manufactured (1, 3D model, and 2, slicing, FIG. 2), remains in powder form.

Once the first layer has been processed as described above, the movable table is lowered (5, lowering platform, FIG. 2) and a subsequent layer of blended powders is distributed on top of the first layer. The second layer of blended powders is in turn selectively melted and subsequently allowed to cool and solidify. Melting and solidifying are performed such that each layer portion will adhere to the previously formed layer portion. The process is repeated stepwise, until the entire final product is formed, by subsequently adding one blended powder layer after the other and selectively melting and solidifying layer portions corresponding to subsequent cross sections of the desired final product, as illustratively shown in FIG. 2 (1, 3D model, and 2, slicing).

Once the product has been completed, the powders which have not been melted and solidified can be removed and recycled.

It should be appreciated that the step of melting, in an embodiment via DMLM, allows to obtain fusion of the powders instead of sinterization. In this way, it is possible to have a more homogeneous microstructure and avoid lack of sintering among particles that results in a mechanical fragility. Moreover, all the benefits associated with AM technology for the gas turbine application are gained: avoid expensive molds, cost reduction, lead time reduction, new design. For example, the application of these silicide-based composite materials on gas turbine hot gas path (HGP) components will allow to increase gas turbine power and efficiency by reduction or avoidance of component cooling. This is possible by designing uncooled parts (no internal cooling channels) owing to the material above described, that is an enabler to increase component metal temperature.

Optionally, in order to further reduce the porosity and increase the density of the final material, the same can be additionally treated by Hot Isostatic Processing, in an embodiment after compressive stress treatment. The Hot Isostatic Processing may be carried out on the material before removal from the support surface.

Additionally, the process may also comprise a further step of solution heat treatment of the material.

Alternatively, the process for producing the silicide-based composite material comprises the steps of:
a) providing powders of silicide, $Si_3N_4$, and at least an oxide,
b) homogeneously blending the powders,
c) lying at least a first layer of blended powders on a support surface,
d) depositing binder droplets on the layer of blended powders, and
e) allowing the powders to dry by using a heating source, thus obtaining the silicide-based composite material.

In particular, steps c) to e) are performed by Binder Jet (BJ).

In embodiments, said binder droplets are droplets of an acrylic copolymer dispersion resin, polycarbosilane, silicone, or a mixture thereof.

The process above can be carried out until a desired thickness and shape of the silicide-based composite material is achieved. In this regard, the process can further comprise the steps of:
f) lying a second layer of blended powders on the silicide-based composite material obtained in step e), said second layer at least partially covering the material surface,
g) repeating the steps c) and d), thus obtaining a second layer of the silicide-based composite material, which adheres to the silicide-based composite material of step e), and optionally
h) repeating the steps f) and g) by lying a third and further layers of blended powders, until a desired thickness and shape of the silicide-based composite material is achieved.

A post processing phase can be additionally performed, said phase comprising the following steps:
i) curing the silicide-based composite material at a temperature higher than 200° C. for at least 2.5 h,
j) debinding at a high temperature, in an embodiment of 500-750° C., in inert atmosphere or under vacuum,
k) sintering at a high temperature, in an embodiment of 1500-1700° C., and in inert atmosphere or under vacuum.

Step i) is in an embodiment performed in a drying oven.

In step k), the sintering is performed at a temperature of about 1650° C. and under vacuum.

Optionally, in order to further reduce the porosity and increase the density of the final material, the same can be additionally treated by Hot Isostatic Processing, in an embodiment after compressive stress treatment. The Hot Isostatic Processing may be carried out on the material before removal from the support surface.

Alternatively, the silicide-based composite material can be produced by Injection moulding (IM).

Third embodiments of the subject matter disclosed herein correspond to a silicide-based composite material obtainable by the processes above.

In general, the material so obtained shows remarkably improved mechanical, physical and thermal properties with respect to conventional super-alloys.

In particular, a silicide-based composite material obtainable by the processes above, comprises a silicide selected from the group consisting of $MoSi_2$, a Mo—Si—B alloy, or a combination thereof, $Si_3N_4$, and at least an oxide selected from the group consisting of Yttrium oxides, Cerium oxides, and combination thereof, said material having a porosity lower than 0.5%, a density of 4-5 g/cm$^3$, a directionally solidified grain structure, and an average grain size of 50-150 μm.

The maximum dimension of the pores, measurable by SEM, is below 100 μm.

In embodiments, the material has an Ultimate Tensile Strength (UTS) higher than 700 MPa at 23° C. and higher than 550 MPa at 900° C.

In embodiments, the material has a Young's modulus (E) higher than 300 GPa at 23° C. and higher than 290 MPa at 900° C.

In embodiments, the material has a Critical Value of Stress Intensity Factor (Kc) higher than 5 MPa/m at 23° C. and higher than 10 MPa/m at 900° C.

In embodiments, the material comprises α-$Si_3N_4$ and β-$Si_3N_4$, the latter being acicular. In fact, the additive process promotes the growth of acicular β-$Si_3N_4$; the at least an oxide, in an embodiment in the form of grains having average size <50 μm, induces crack deflection, so this type of microstructure is desirable in order to increase the fracture toughness.

The resulting microstructure of the material is a well dispersed silicide and $Si_3N_4$ particles surrounded by a grain boundary phase. No reaction occurs between silicide and $Si_3N_4$ and no cracks are detected despite the thermal expansion mismatch between the two compounds. The oxides are located to grain boundaries that are supposed to be completely amorphous.

The acicular $\beta$-$Si_3N_4$ is developed and this can be confirmed by XRD measures.

Summarizing, the final microstructures is composed by grains of $Si_3N_4$ (substantially rounded in the $\alpha$ and acicular in the $\beta$ crystallographic form), by grains of silicide, and by an amorphous phase at grain boundaries containing the oxides (Yttria and Ceria).

It should be understood that all aspects identified as preferred and advantageous for the silicide-based composite material are to be deemed as similarly preferred and advantageous also for the respective processes of production and material obtainable thereby.

Fourth embodiments of the subject matter disclosed herein correspond to a gas turbine hot gas path (HGP) component, such as a bucket, nozzle, and shroud, made of the above material.

It should be also understood that all the combinations of preferred aspects of the silicide-based composite material, processes of production and material obtainable thereby, as well as their uses in gas turbine applications, as above reported, are to be deemed as hereby disclosed.

While the disclosed embodiments of the subject matter described herein have been fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:
1. A silicide-based composite material comprising:
   a silicide of Mo, B, W, Nb, Ta, Ti, Cr, Co, Y, or a combination thereof;
   20-40 wt % of $Si_3N_4$;
   0.5<8 wt % of $Y_2O_3$;
   0.5-6 wt % of $CeO_2$ and
   up to 4 wt % of impurities, the impurities comprising Al, C, Fe, Ca, O, N, or a combination thereof.
2. The material of claim 1, wherein the silicide is selected from the group consisting of $MoSi_2$, $Mo_5SiB_2$, $Mo_3Si$, $Mo_5SiB_2$, $\alpha$-Mo—$Mo_5SiB_2$—$Mo_3Si$, $WSi_2$, $NbSi_2$, $TaSi_2$, $TiSi_2$, $CrSi_2$, $CoSi_2$, $YSi_2$, $Mo_5Si_3$, $Ti_5Si_3$, and combinations thereof.
3. The material of claim 1, further comprising
   20-40 wt % of $Si_3N_4$,
   0.5-6 wt % of $Y_2O_3$,
   0.5-4 wt % of $CeO_2$,
   <0.1 wt % of Al,
   <0.5 wt % of C,
   <0.1 wt % of Fe,
   <0.1 wt % of Ca,
   <1.5 wt % of O,
   <0.5 wt % of N, and
   the remainder being $MoSi_2$.
4. The material of claim 1, wherein the material has a porosity lower than 0.5%, a density of 4-5 g/cm3, a directionally solidified grain structure, and an average grain size of 50-150 µm.
5. A gas turbine hot gas path component, the component being a bucket, a nozzle, or a shroud made of the material of claim 1.

* * * * *